(12) United States Patent
Ho

(10) Patent No.: US 11,064,681 B2
(45) Date of Patent: Jul. 20, 2021

(54) TOY FOR PETS

(71) Applicant: Ying Yeeh Enterprise Co., Ltd., Tainan (TW)

(72) Inventor: Wang-Jyun Ho, Tainan (TW)

(73) Assignee: Ying Yeeh Enterprise Co., Ltd., Tainan (TW)

( * ) Notice: Subject to any disclaimer, the term of this patent is extended or adjusted under 35 U.S.C. 154(b) by 310 days.

(21) Appl. No.: 16/365,769

(22) Filed: Mar. 27, 2019

(65) Prior Publication Data

US 2020/0305393 A1  Oct. 1, 2020

(51) Int. Cl.
*A01K 15/02* (2006.01)
*F16M 11/12* (2006.01)

(52) U.S. Cl.
CPC ......... *A01K 15/027* (2013.01); *F16M 11/123* (2013.01)

(58) Field of Classification Search
CPC ..... B43M 11/00; B43M 11/02; A63H 33/005; A63H 18/028; A01K 15/027; A01K 15/02; A63B 19/04; A63B 19/00; A63B 19/02; G01C 19/06; G01C 19/30
See application file for complete search history.

(56) References Cited

U.S. PATENT DOCUMENTS

| | | | | |
|---|---|---|---|---|
| 3,682,477 A | * | 8/1972 | Harkins | A01K 15/027 119/702 |
| 6,071,167 A | * | 6/2000 | Yang | A63H 33/005 446/236 |
| 2015/0027013 A1 | * | 1/2015 | Simeray | A63F 9/0873 40/409 |
| 2015/0231520 A1 | * | 8/2015 | Striggow | A63F 9/0873 40/409 |

OTHER PUBLICATIONS

YouTube video entitled (Scritchit scampers in her GyroBall!); https://www.youtube.com/watch?v=4rtLHo9VHsk (Year: 2007).*

* cited by examiner

*Primary Examiner* — Joshua J Michener
*Assistant Examiner* — Brittany A Lowery

(57) ABSTRACT

A toy for pets includes a supporting frame, an annular frame, and a running ball. The rods extending respectively from the two opposite ends of the central axis of the running ball are inserted respectively into a pair of opposite holes in the inner periphery of the annular frame to pivotally connect the running ball to the annular frame. The rods extending inward from the two lateral sides of the supporting frame are inserted respectively into a pair of opposite holes in the outer periphery of the annular frame to pivotally connect the annular frame to the supporting frame, wherein the two pairs of holes are angularly offset from each other. A pet running in the running ball can generate a driving force that changes the direction of the running ball and of the annular frame and thereby changes the running direction of the pet itself.

4 Claims, 12 Drawing Sheets

TOY FOR PETS

BACKGROUND OF THE INVENTION

1. Technical Field

The present invention relates to a toy for pets and more particularly to a toy that not only provides a pet (e.g., a hamster) with a running space, but also allows the running space to change directions during use so that the pet can run in different directions and have more fun while using the toy.

2. Description of Related Art

Generally, devices intended as a play area or hiding place for pets are designed according to the habitual activities of the target animals. Pet exercise devices (e.g., hamster balls) and pet resting devices (e.g., hidden pet houses) on the market, be they movable (e.g., rotatable) spaces or stationary assembled rooms, are all configured to satisfy the needs of daily activities of pets and include a plurality of components that must be put together in a predetermined manner. Some devices may be disassembled and then reassembled into a different configuration.

BRIEF SUMMARY OF THE INVENTION

The present invention relates to a toy for pets that is inspired by a pet's running wheel and allows a pet to change directions while running. The toy includes a supporting frame, an annular frame, and a running ball. The running ball is well known in the art and therefore is not a technical feature of the toy. The technical features of the toy are as follows: the rods extending respectively from the two opposite ends of the central axis of the running ball are inserted respectively into a pair of opposite holes in the inner periphery of the annular frame to pivotally connect the running ball to the annular frame, the rods extending inward from the two lateral sides of the supporting frame are inserted respectively into a pair of opposite holes in the outer periphery of the annular frame to pivotally connect the annular frame to the supporting frame, and the two pairs of opposite holes are angularly offset from each other. A pet running in the running ball can generate a driving force that changes the direction of the running ball and of the annular frame and thereby changes the running direction of the pet itself so that the pet can run in any horizontal or vertical direction.

The first primary objective of the present invention is to provide a toy for pets. The toy provides a running space in which a pet can run, and the direction of the running space can be changed during use in order for the pet to run in different directions. The toy includes a supporting frame, an annular frame, and a running ball. The running ball is well known in the art and hence not a technical feature of the toy. The technical features of the toy are summarized as follows. The annular frame includes plural pairs of opposite receiving areas that are located respectively inside predetermined sections of the annular frame and are spaced apart from one another. Each receiving area is provided therein with a bearing having a bore. The inner periphery of the annular frame is provided with at least one pair of opposite holes that correspond respectively to one of the plural pairs of opposite receiving areas. The outer periphery of the annular frame is provided with at least one pair of opposite holes that correspond respectively to another of the plural pairs of opposite receiving areas. The supporting frame has two lateral sides each provided with an inwardly extending first rod. The first rods are inserted respectively into the pair of opposite holes in the outer periphery of the annular frame and then into the bores of the bearings in the corresponding pair of opposite receiving areas such that the annular frame is pivotally connected to the supporting frame. The running ball has a central axis whose two opposite ends are each extended with a second rod. The second rods are inserted respectively into the pair of opposite holes in the inner periphery of the annular frame and then into the bores of the bearings in the corresponding pair of opposite receiving areas such that the running ball is pivotally connected to the annular frame. Once the toy is assembled, a pet can be placed into the running ball to run therein. The pet can generate a driving force while running, and the driving force can change the direction of the running ball, which is pivotally connected to the annular frame, and the direction of the annular frame, which is pivotally connected to the supporting frame, thereby changing the running direction of the pet and allowing the pet to run in any horizonal or vertical direction.

The second primary objective of the present invention is to provide a toy for pets, wherein the toy provides a running space in which a pet can run, wherein the direction of the running space can be changed during use in order for the pet to run in different directions, and wherein the toy includes a supporting frame, an outer annular frame, an inner annular frame, and a running ball. The running ball is well known in the art and hence not a technical feature of the toy. The technical features of the toy are summarized as follows. The inner annular frame includes plural pairs of opposite receiving areas that are located respectively inside predetermined sections of the inner annular frame and are spaced apart from one another. Similarly, the outer annular frame includes plural pairs of opposite receiving areas that are located respectively inside predetermined sections of the outer annular frame and are spaced apart from one another. Each receiving area is provided therein with a bearing having a bore. The inner periphery of the inner annular frame is provided with plural pairs of opposite holes that correspond respectively to the plural pairs of opposite receiving areas in the inner annular frame. The outer periphery of the inner annular frame is provided with a pair of outwardly extending and opposite third rods. The inner periphery of the outer annular frame is provided with at least one pair of opposite holes that correspond respectively to one of the plural pairs of opposite receiving areas in the outer annular frame. The third rods are inserted respectively into the pair of opposite holes in the inner periphery of the outer annular frame and then into the bores of the bearings in the corresponding pair of opposite receiving areas in the outer annular frame such that the inner annular frame is pivotally connected to the outer annular frame. The outer periphery of the outer annular frame is provided with at least one pair of opposite holes that correspond respectively to another of the plural pairs of opposite receiving areas in the outer annular frame. The supporting frame has two lateral sides each provided with an inwardly extending first rod. The first rods are inserted respectively into the pair of opposite holes in the outer periphery of the outer annular frame and then into the bores of the bearings in the corresponding pair of opposite receiving areas in the outer annular frame such that the outer annular frame is pivotally connected to the supporting frame. The running ball has a central axis whose two opposite ends are each extended with a second rod. The second rods can be inserted respectively into any of the plural pairs of opposite holes in the inner periphery of the inner annular frame and then into the bores of the bearings in the corresponding pair of opposite receiving areas in the inner annular frame such that the running ball is pivotally connected to the inner annular frame. Once the toy is assembled, a pet can be placed into the running ball to run therein. The pet can generate a driving force while running, and the driving force can change the direction of the running ball, which is pivotally connected to the inner annular frame, the direction of the inner annular frame, which is pivotally connected to the outer annular frame, and the direction of the outer annular frame, which is pivotally connected to the supporting frame, thereby changing the running direction of the pet and allowing the pet to run in any horizontal or vertical direction.

The third objective of the present invention is to provide the toy described above with reference to the second primary objective of the invention, wherein the central axis of the running ball can be tilted with respect to the inner annular frame by inserting the second rods respectively into a selected one of the plural pairs of opposite holes in the inner periphery of the inner annular frame and then into the bores of the bearings in the corresponding pair of opposite receiving areas in the inner annular frame. When the central axis of the running ball is tilted, the driving force generated by the pet can still change the direction of the running ball, the direction of the inner annular frame, and the direction of the outer annular frame and thereby change the running direction of the pet.

The fourth objective of the present invention is to provide the toy described above with reference to the first primary objective of the invention, wherein the second rods extending respectively from the two opposite ends of the central axis of the running ball are each formed with a protuberance at a predetermined position. Once the second rods are inserted respectively into the pair of opposite holes in the inner periphery of the annular frame and then into the bores of the bearings in the corresponding pair of opposite receiving areas, the protuberances lie generally between the annular frame and the running ball to allow the running ball to rotate smoothly in the space surrounded by the annular frame.

The fifth objective of the present invention is to provide the toy described above with reference to the second primary objective of the invention, wherein the pair of opposite third rods extending outward from the outer periphery of the inner annular frame are each formed with a protuberance at a predetermined position. Once the third rods are inserted respectively into the pair of opposite holes in the inner periphery of the outer annular frame and then into the bores of the bearings in the corresponding pair of opposite receiving areas in the outer annular frame, the protuberances lie generally between the inner annular frame and the outer annular frame to allow the inner annular frame, to which the running ball is pivotally connected, to rotate smoothly in the space surrounded by the outer annular frame.

The sixth objective of the present invention is to provide the toy described above with reference to the first primary objective of the invention, and yet the pivotal connection between the supporting frame and the annular frame is implemented differently as follows. Each of the two lateral sides of the supporting frame is provided therein with a receiving area at a predetermined height and has an inner side provided with a hole corresponding to one of the receiving areas in the supporting frame. Each receiving area in the supporting frame is provided therein with a bearing having a bore. The outer periphery of the annular frame is provided with a pair of outwardly extending and opposite fourth rods. The fourth rods are inserted respectively into the holes of the supporting frame and then into the bores of the bearings in the receiving areas in the supporting frame such that the annular frame is pivotally connected to the supporting frame.

DETAILED DESCRIPTION OF THE INVENTION

Figure 1:
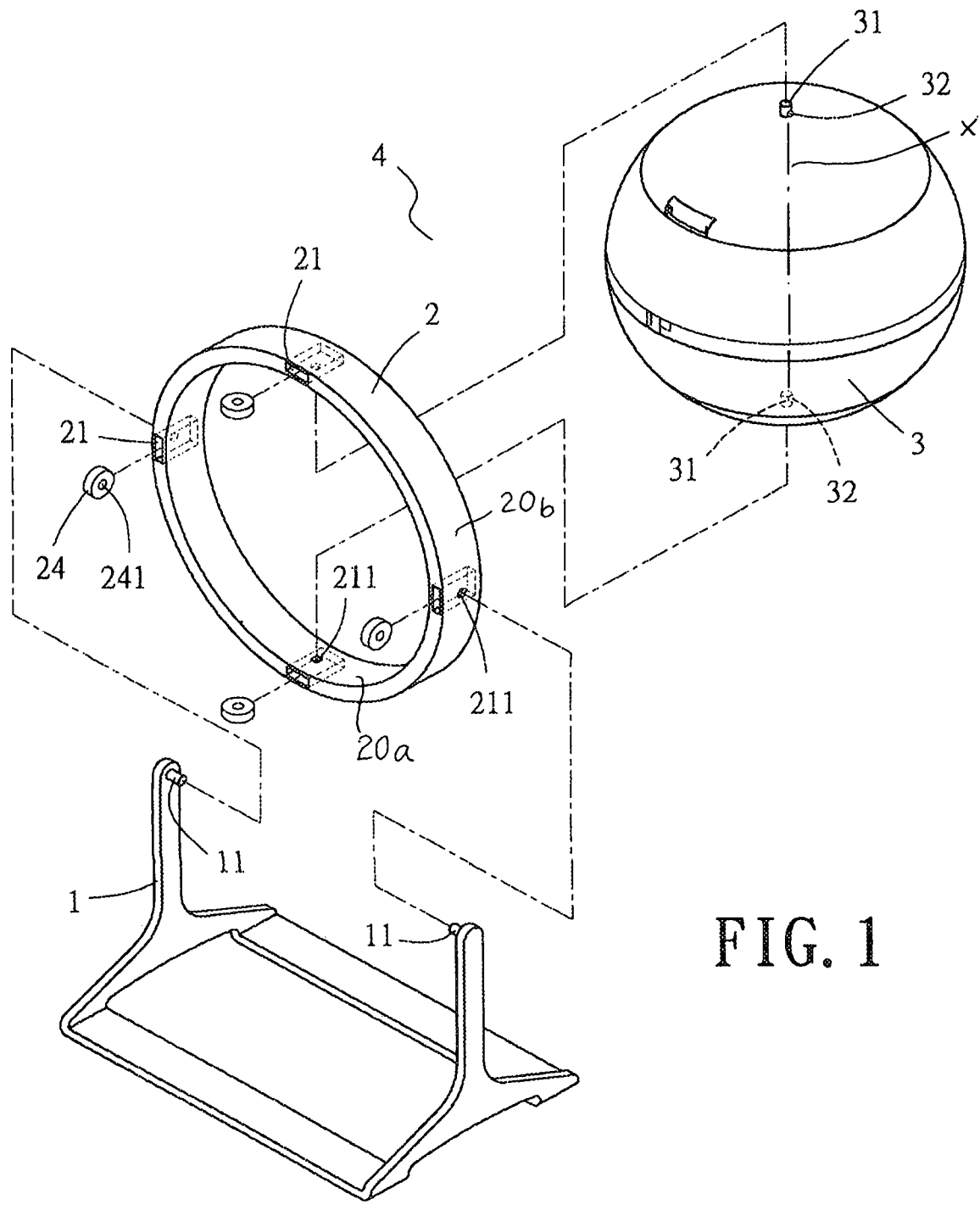
FIG. 1 is an exploded perspective view of a toy for pets according to the present invention, wherein the toy includes a single annular frame.
Figure 2:
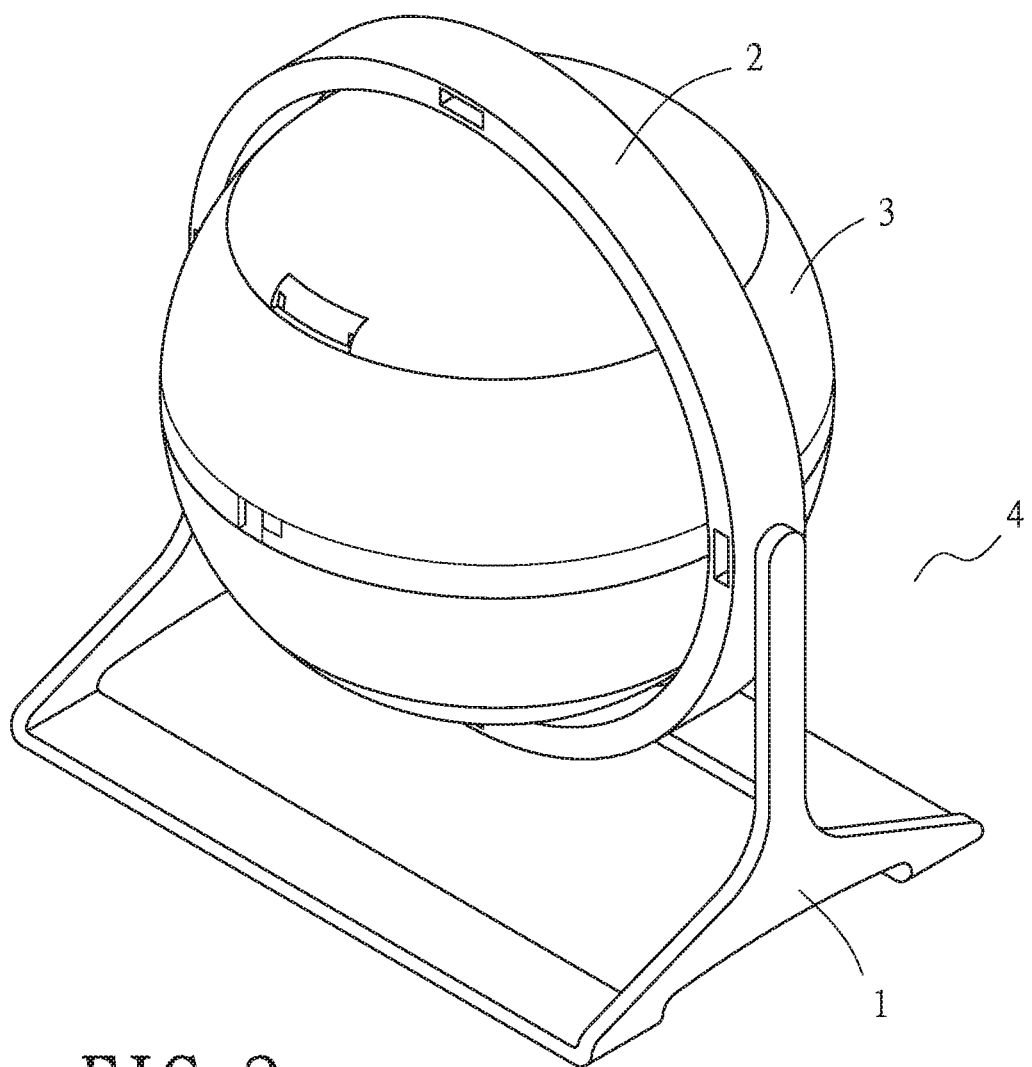
FIG. 2 is an assembled perspective view of the toy in FIG. 1.
Figure 4:
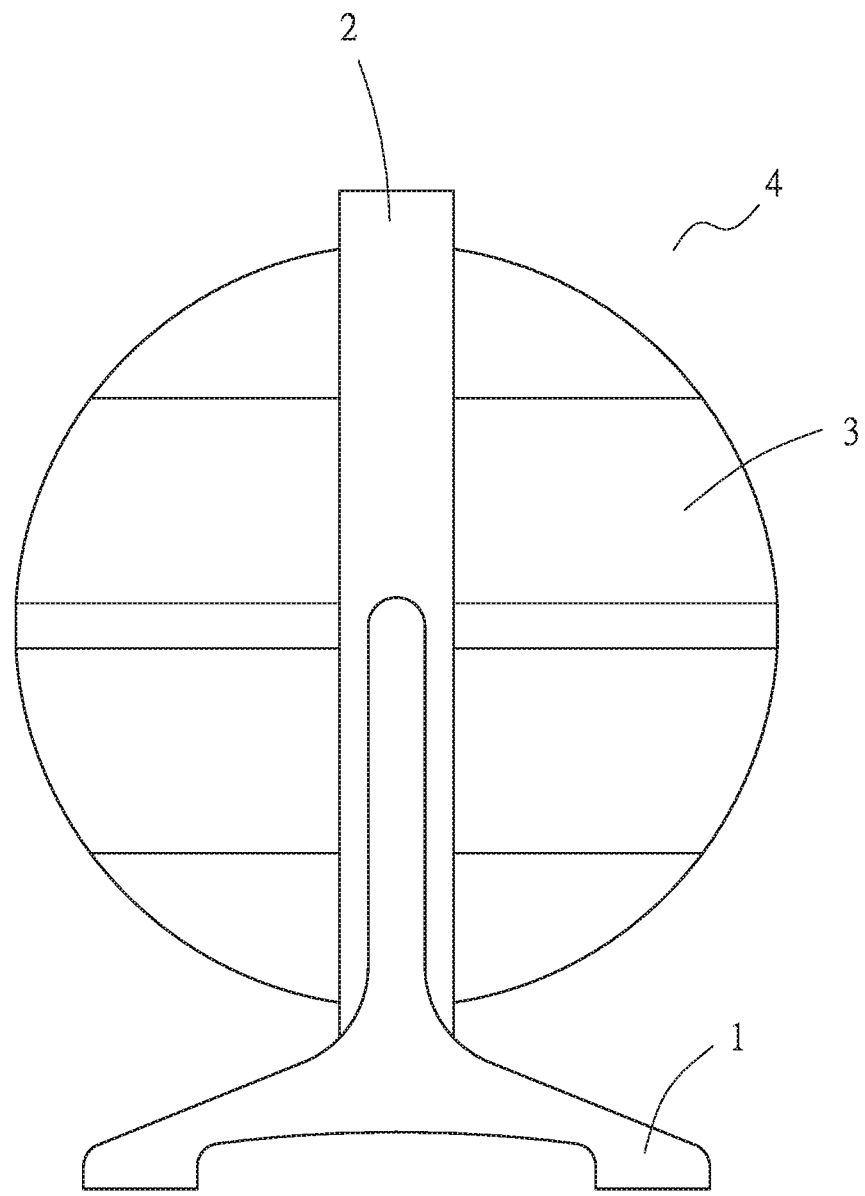
FIG. 4 is an assembled side view of the toy in FIG. 1.
Figure 5:
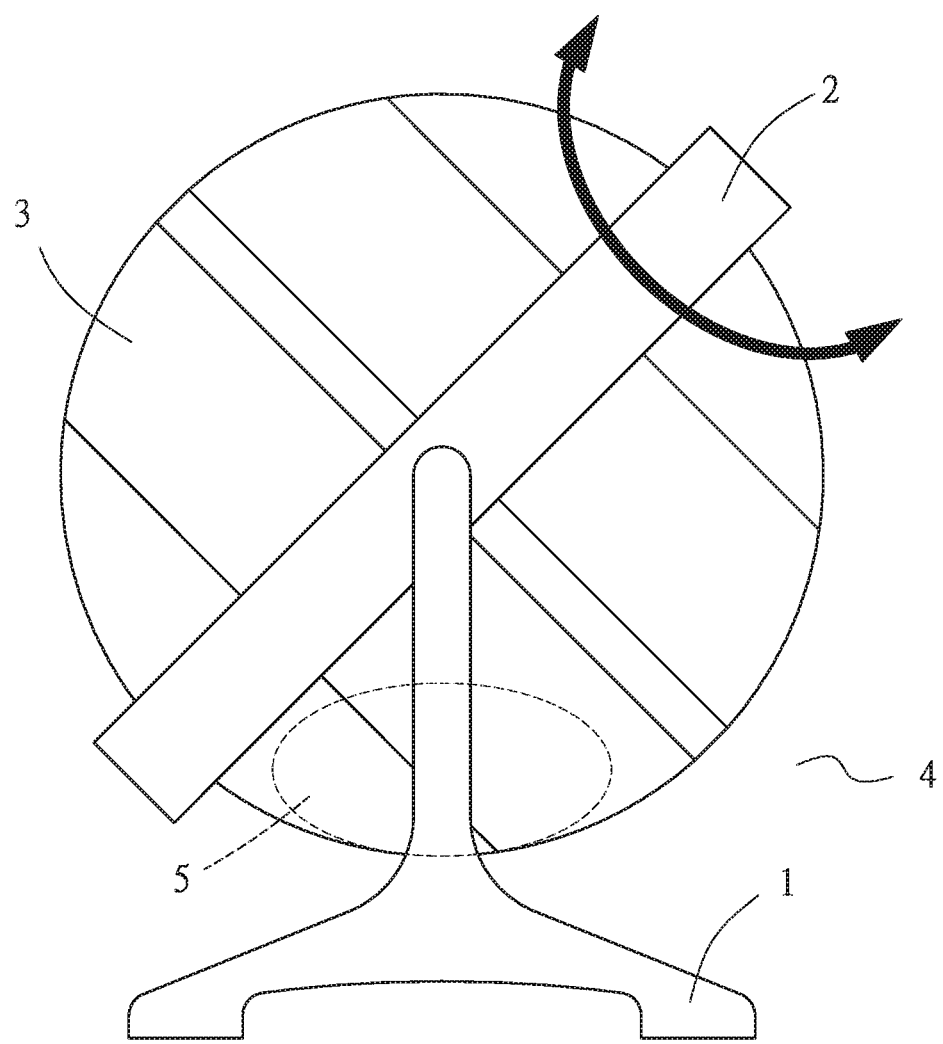
FIG. 5 shows a state of use of the toy in FIG. 1.
Figure 6:
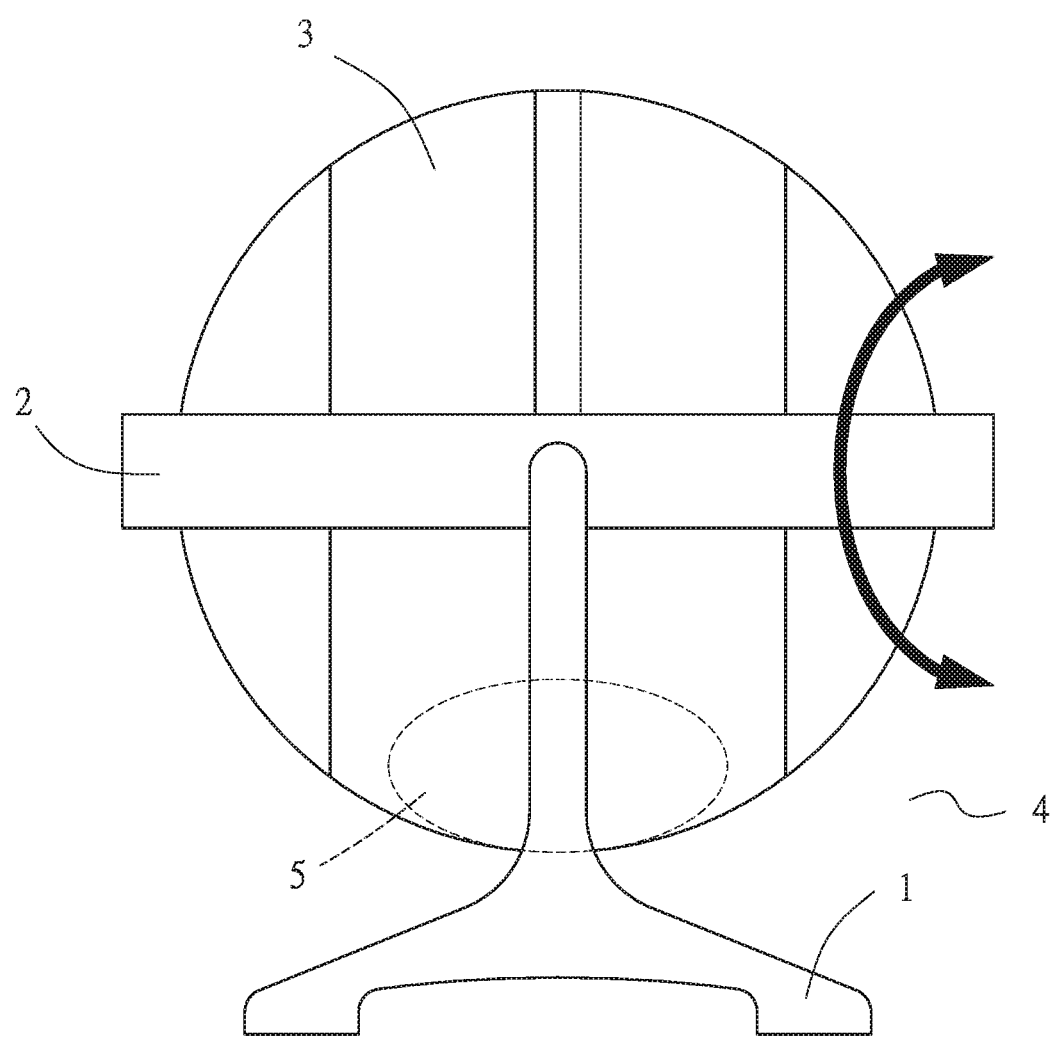
FIG. 6 shows another state of use of the toy in FIG. 1.

Referring to FIG. 1 and FIG. 2, the present invention provides a toy for pets that includes a running space, and the direction of the running space can be changed during use in order for the pet using the toy to run in different directions. More specifically, the toy 4 shown in FIG. 1 and FIG. 2 includes a supporting frame 1, an annular frame 2, and a running ball 3. The running ball 3 is well known in the art and therefore does not constitute a technical feature of the invention. The technical features of this embodiment of the invention are detailed as follows. The annular frame 2 includes a plurality of receiving areas 21. The receiving areas 21 are located respectively inside predetermined sections of the annular frame 2 and are spaced apart from one another. Each receiving area 21 is provided therein with a bearing 24, and each bearing 24 has a bore 241. Here, two pairs of opposite receiving areas 21 are provided in four spaced-apart predetermined sections of the annular frame 2 respectively. The inner periphery of the annular frame 2 has a pair of opposite holes 211 that correspond respectively to one of the two pairs of opposite receiving areas 21. The outer periphery of the annular frame 2 has another pair of opposite holes 211 that correspond respectively to the other pair of opposite receiving areas 21. Each of the two lateral sides of the supporting frame 1 is provided with an inwardly extending rod 11. The rods 11 are inserted respectively into the pair of opposite holes 211 that are formed in the outer periphery of the annular frame 2 and then into the bores 241 of the corresponding bearings 24 (see FIG. 3) such that the annular frame 2 is pivotally connected to the supporting frame 1. The running ball 3 has a central axis, and a rod 31 extends from each of the two opposite ends of the central axis. The rods 31 are inserted respectively into the pair of opposite holes 211 that are formed in the inner periphery of the annular frame 2 and then into the bores 241 of the corresponding bearings 24 such that the running ball 3 is pivotally connected to the annular frame 2 (see FIG. 2 and FIG. 4). Once the toy 4 is assembled, a pet 5 can be put into the running ball 3 and run in the running ball 3 (see FIG. 5 and FIG. 6). While running, the pet 5 generates a driving force that changes the direction of the running ball 3 (which is pivotally connected to the annular frame 2), the direction of the annular frame 2 (which is pivotally connected to the supporting frame 1), and consequently the running direction of the pet 5 itself.

Figure 7:
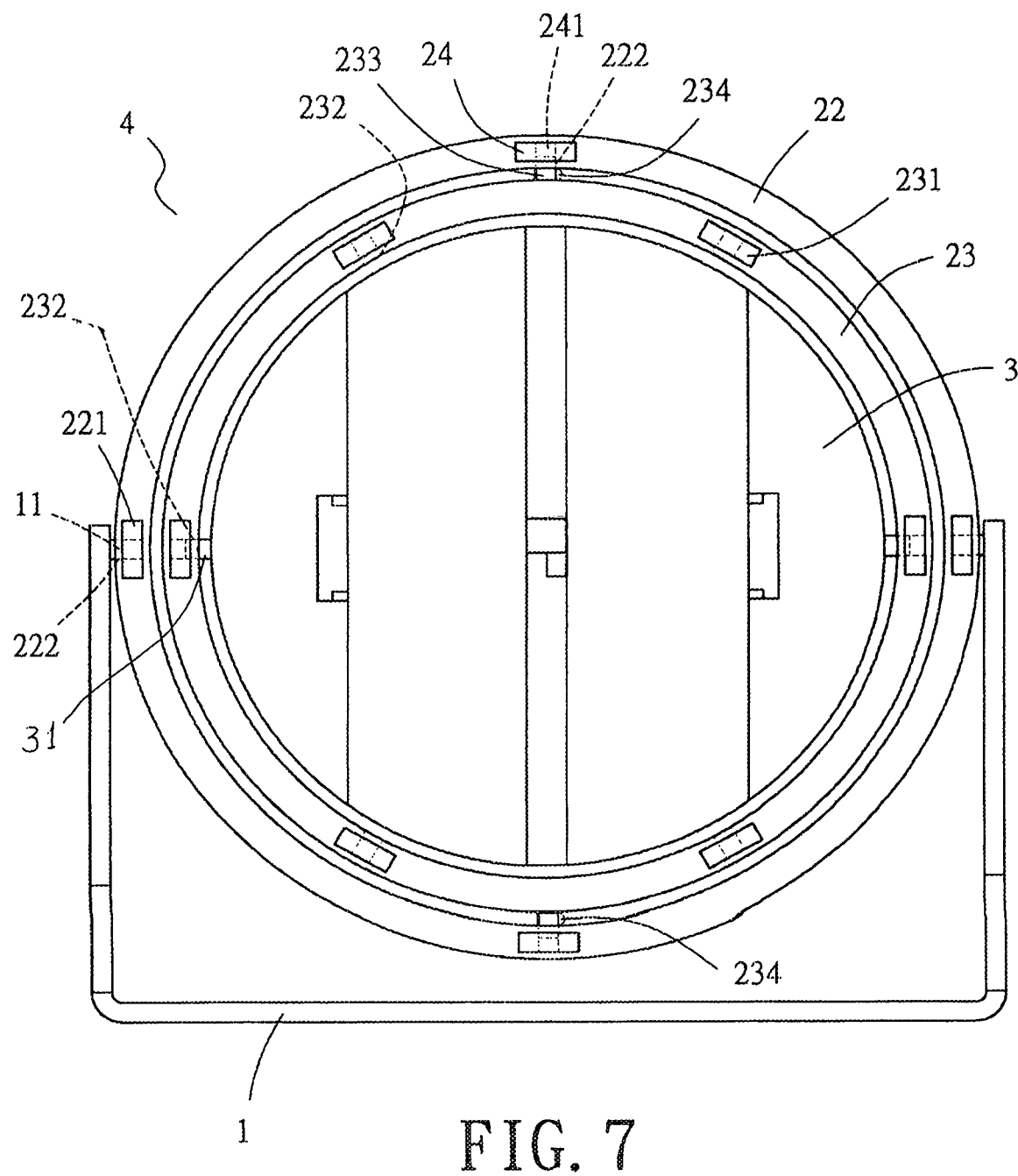
FIG. 7 is an assembled front view of another toy for pets according to the present invention, wherein the toy includes two annular frames and the axis of the running ball is horizontal.
Figure 8:
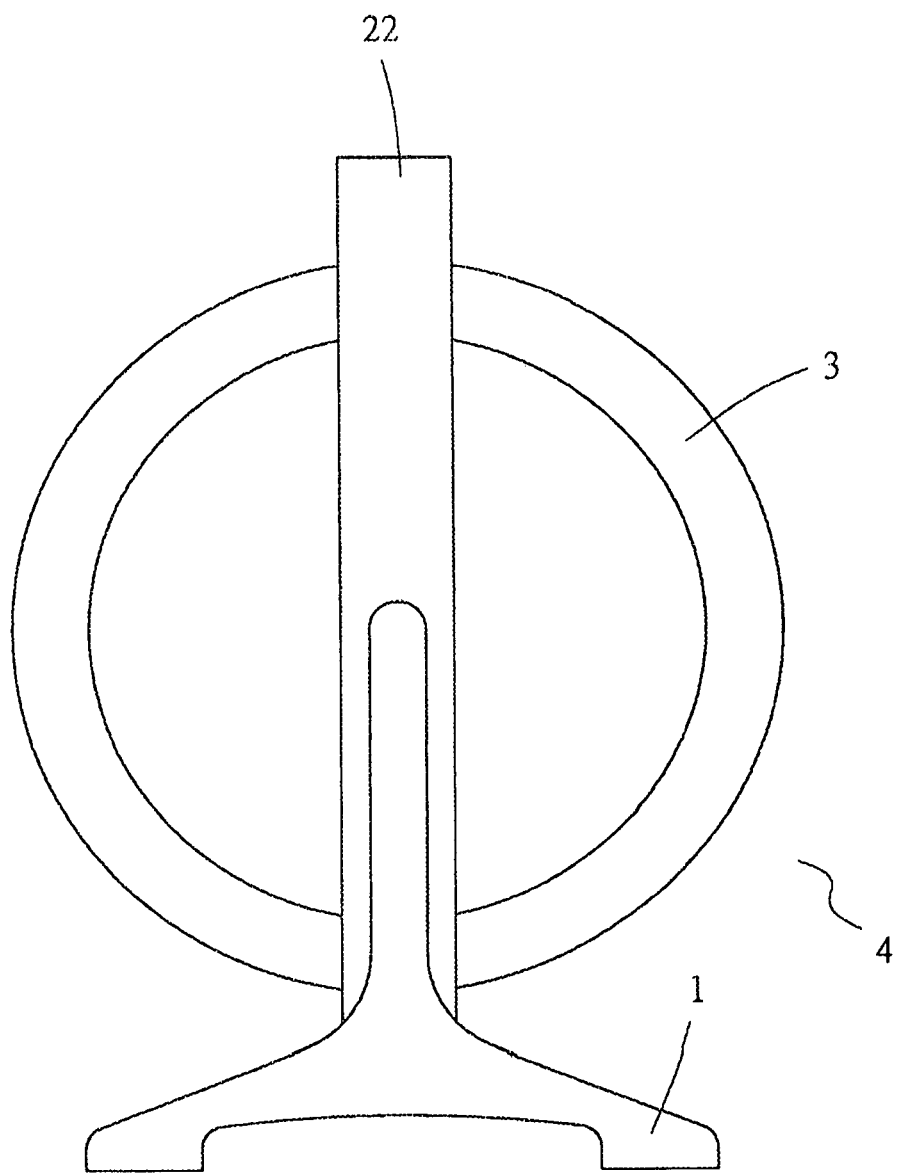
FIG. 8 is an assembled side view of the toy in FIG. 7.
Figure 9:
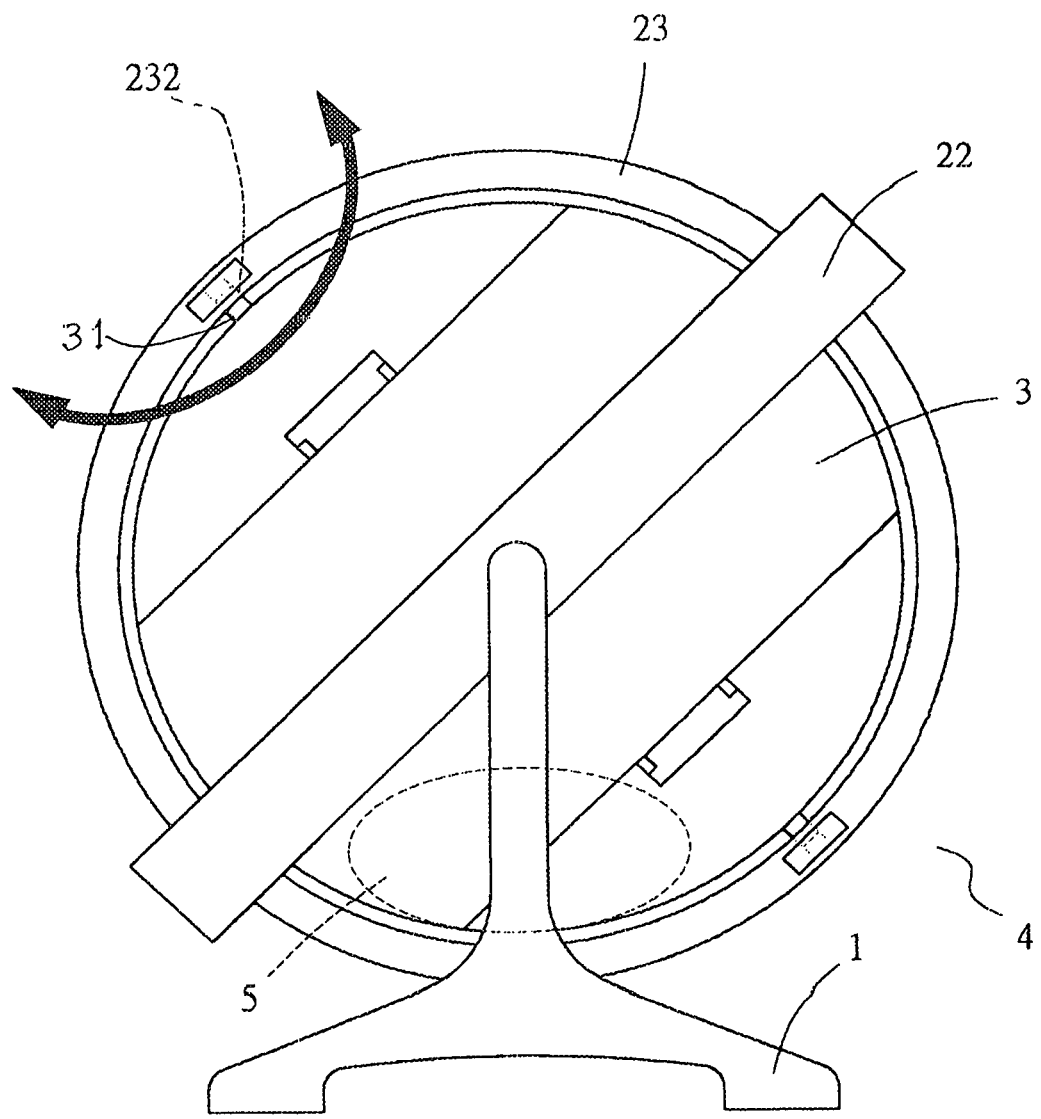
FIG. 9 shows a state of use of the toy in FIG. 7, with the axis of the running ball in an inclined position.

FIG. 7 and FIG. 8 show the toy 4' for pets according to another embodiment of the present invention. The toy 4' also includes a running space, and the direction of the running space can also be changed during use in order for the pet using the toy 4' to run in different directions. More specifically, the toy 4' includes a supporting frame 1, an outer annular frame 22, an inner annular frame 23, and a running ball 3. As in the previous embodiment, the running ball 3 is well known in the art and therefore does not constitute a technical feature of the invention. The technical features of this embodiment of the invention are detailed as follows. The inner annular frame 23 and the outer annular frames 22 include a plurality of receiving areas 231 and a plurality of receiving areas 221 respectively. The receiving areas 231 are located respectively inside predetermined sections of the inner annular frame 23, are spaced apart from one another, and are each provided therein with a bearing 24, which has a bore 241 (the inner annular frame 23 and the bearings 24 therein are similar respectively to the annular frame 2 and the bearings 24 in FIG. 1 and therefore are not shown in exploded view). Similarly, the receiving areas 221 are located respectively inside predetermined sections of the outer annular frame 22, are spaced apart from one another, and are each provided therein with a bearing 24, which has a bore 241 (the outer annular frame 22 and the bearings 24 therein are similar respectively to the annular frame 2 and the bearings 24 in FIG. 1 and therefore are not shown in exploded view, either). Here, three pairs of opposite receiving areas 231 are provided in six spaced-apart predetermined sections of the inner annular frame 23 respectively, and two pairs of opposite receiving areas 221 are provided in four spaced-apart predetermined sections of the outer annular frame 22 respectively. The inner periphery of the inner annular frame 23 has three pairs of opposite holes 232 that correspond respectively to the three pairs of opposite receiving areas 231 in the inner annular frame 23. A pair of rods 233 extend respectively from two predetermined opposite positions of the outer periphery of the inner annular frame 23. The inner periphery of the outer annular frame 22 has a pair of opposite holes 222 that correspond respectively to one of the two pairs of opposite receiving areas 221 in the outer annular frame 22. The rods 233 of the inner annular frame 23 are inserted respectively into the pair of opposite holes 222 that are formed in the inner periphery of the outer annular frame 22 and then into the bores 241 of the corresponding bearings 24 such that the inner annular frame 23 is pivotally connected to the outer annular frame 22. The outer periphery of the outer annular frame 22 has another pair of opposite holes 222 that correspond respectively to the other pair of opposite receiving areas 221 in the outer annular frame 22. Each of the two lateral sides of the supporting frame 1 is provided with an inwardly extending rod 11. The rods 11 are inserted respectively into the pair of opposite holes 222 that are formed in the outer periphery of the outer annular frame 22 and then into the bores 241 of the corresponding bearings 24 such that the outer annular frame 22 is pivotally connected to the supporting frame 1. The running ball 3 has a central axis, and a rod 31 extends from each of the two opposite ends of the central axis. The rods 31 are inserted respectively into one of the three pairs of opposite holes 232 in the inner periphery of the inner annular frame 23 and then into the bores 241 of the corresponding bearings 24 such that the running ball 3 is pivotally connected to the inner annular frame 23. Once the toy 4' is assembled, a pet 5 can be put into the running ball 3 to run therein (see FIG. 9), and while the pet 5 is running, the running direction of the pet 5 will change as the direction of the running ball 3 (which is pivotally connected to the inner annular frame 23), the direction of the inner annular frame 23 (which is pivotally connected to the outer annular frame 22), and the direction of the outer annular frame 22 (which is pivotally connected to the supporting frame 1) are changed by the driving force generated by the pet 5.

As mentioned above, the inner annular frame 23, which is provided adjacent to the outer annular frame 22, includes plural pairs (three pairs as in the embodiment shown in FIG. 10) of receiving areas 231, and the receiving areas 231 are located respectively inside predetermined sections of the inner annular frame 23, are spaced apart from one another, and are each provided therein with a bearing 24 having a bore 241. Thanks to the multiple pairs of receiving areas 231 and the bearings 24 therein, the angle at which the running ball 3 is installed can be selected as needed. More specifically, the rods 31 extending respectively from the two opposite ends of the central axis of the running ball 3 can be inserted respectively into the desired pair of opposite holes 232 in the inner periphery of the inner annular frame 23 and then into the bores 241 of the corresponding bearings 24 so that the central axis of the running ball 3 is tilted with respect to the inner annular frame 23 (see FIG. 11). In that case, the direction of the running ball 3, of the inner annular frame 23, and of the outer annular frame 22 can still be changed by the driving force generated by the pet 5 running the running ball 3.

Figure 3:
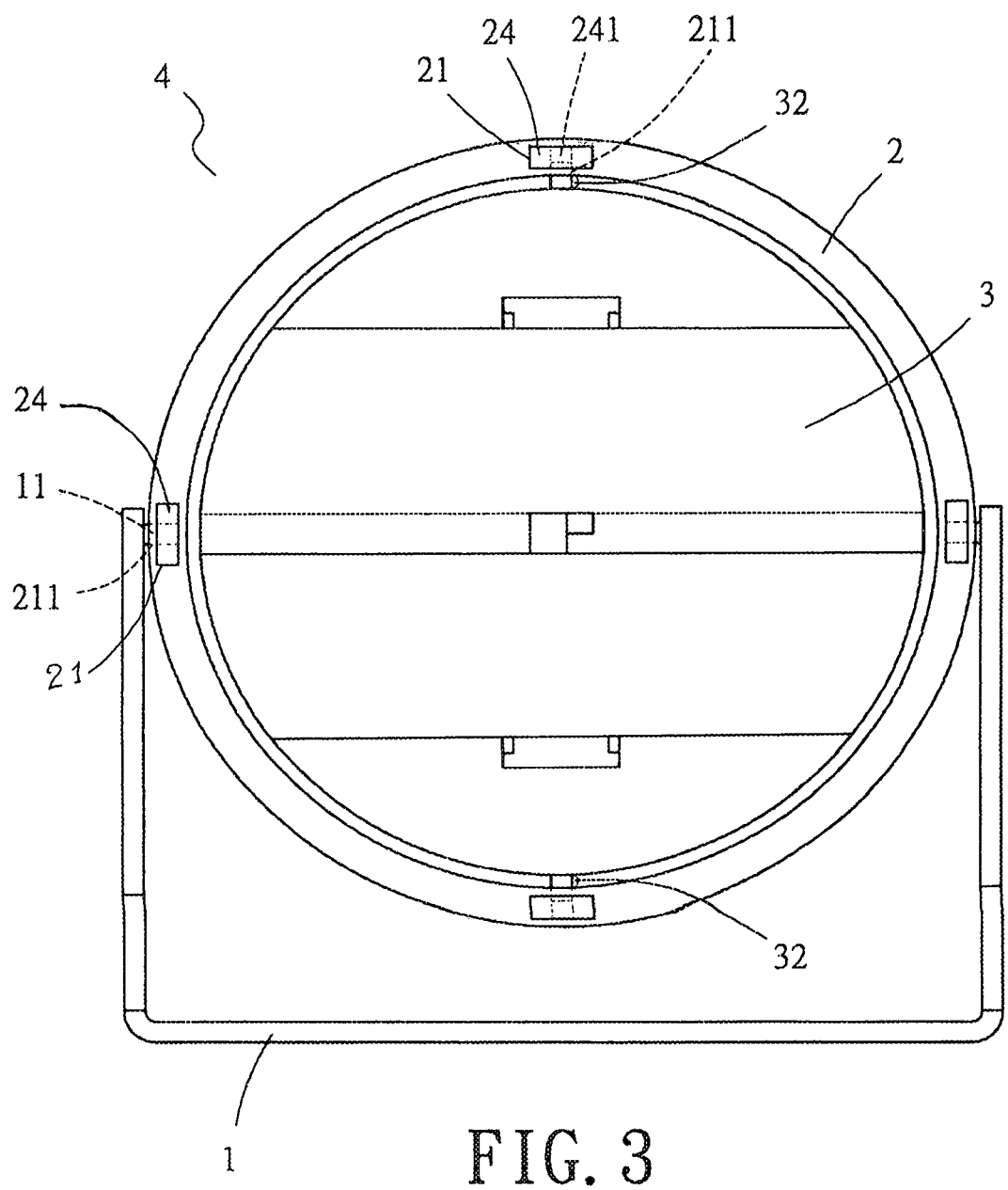
FIG. 3 is an assembled front view of the toy in FIG. 1.

Referring back to FIG. 1, the rods 31 extending respectively from the two opposite ends of the central axis of the running ball 3 of the toy 4 are each formed with a protuberance 32 at a predetermined position. When the rods 31 extending respectively from the two opposite ends of the central axis of the running ball 3 are inserted respectively into the pair of opposite holes 211 in the inner periphery of the annular frame 2 and the bores 241 of the corresponding bearings 24, as shown in FIG. 3, the protuberances 32 lie generally between the annular frame 2 and the running ball 3 so that the running ball 3 can rotate smoothly in the space surrounded by the annular frame 2 (the protuberances 32 also allow the rods 31 to have a relatively short length).

Figure 10:
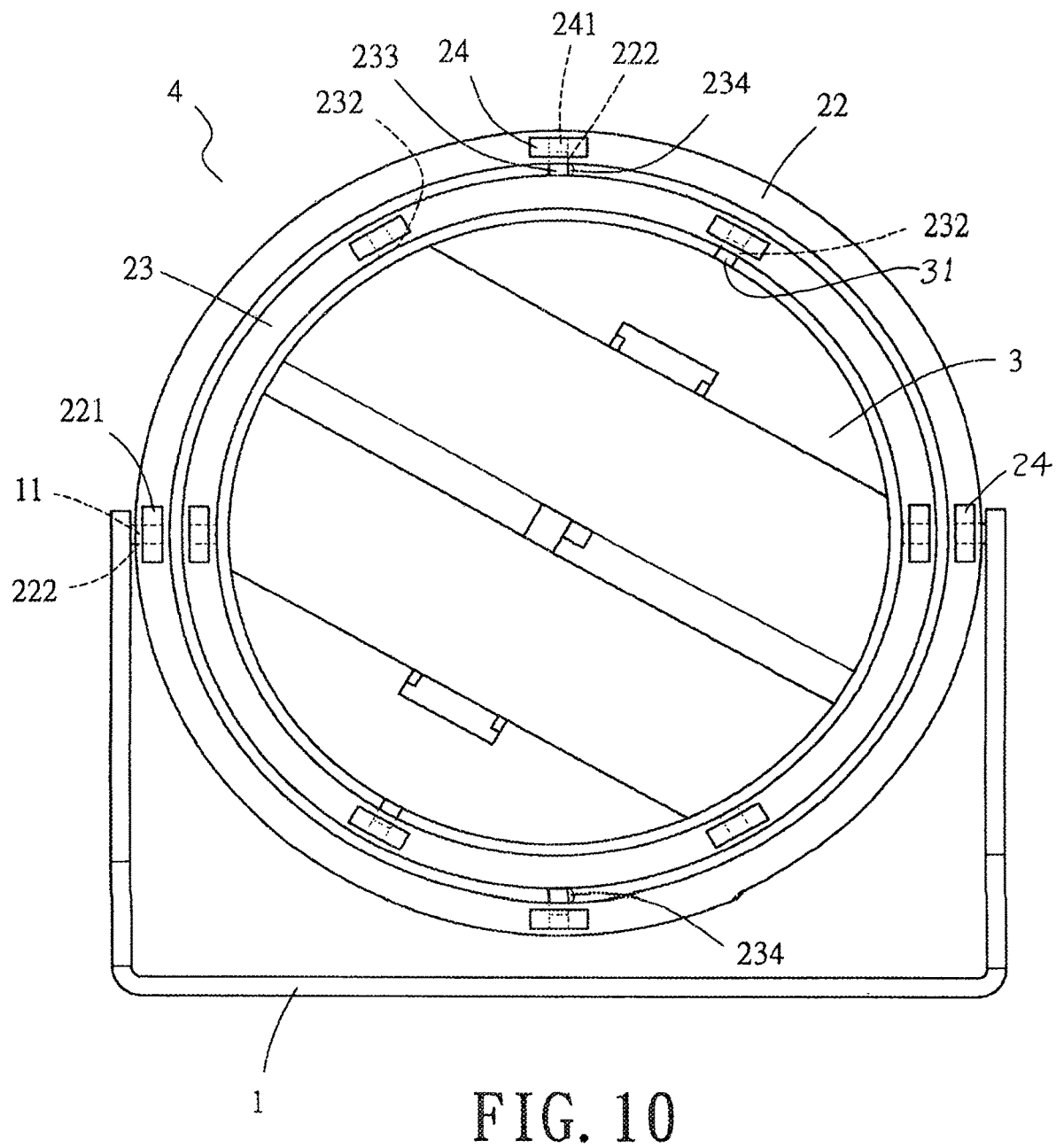
FIG. 10 is another assembled front view of the toy in FIG. 7, with the axis of the running ball in an inclined position.
Figure 11:
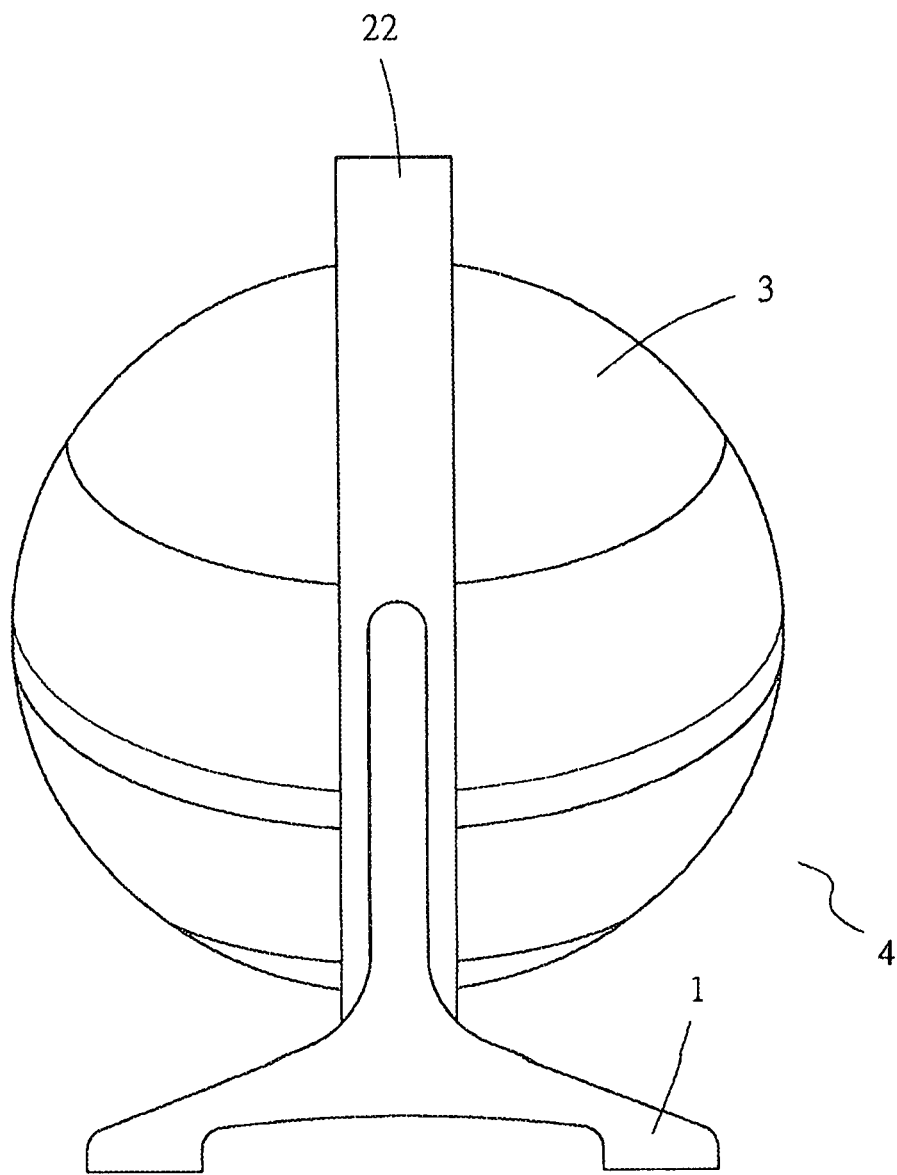
FIG. 11 is an assembled side view of the toy in FIG. 7, with the axis of the running ball in an inclined position.

Similarly, referring to FIG. 7, the rods 233 extending respectively from the two predetermined opposite positions of the outer periphery of the inner annular frame 23 of the toy 4' are each formed with a protuberance 234 at a predetermined position. When the rods 233 extending from the inner annular frame 23 are inserted respectively into the pair of opposite holes 222 in the inner periphery of the outer annular frame 22 and the bores 241 of the corresponding bearings 24, as shown in FIG. 10, the protuberances 234 lie generally between the inner annular frame 23 and the outer annular frame 22 so that the inner annular frame 23, to which the running ball 3 is pivotally connected, can rotate smoothly in the space surrounded by the outer annular frame 22 (the protuberances 234 also allow the rods 233 to have a relatively short length).

Figure 12:
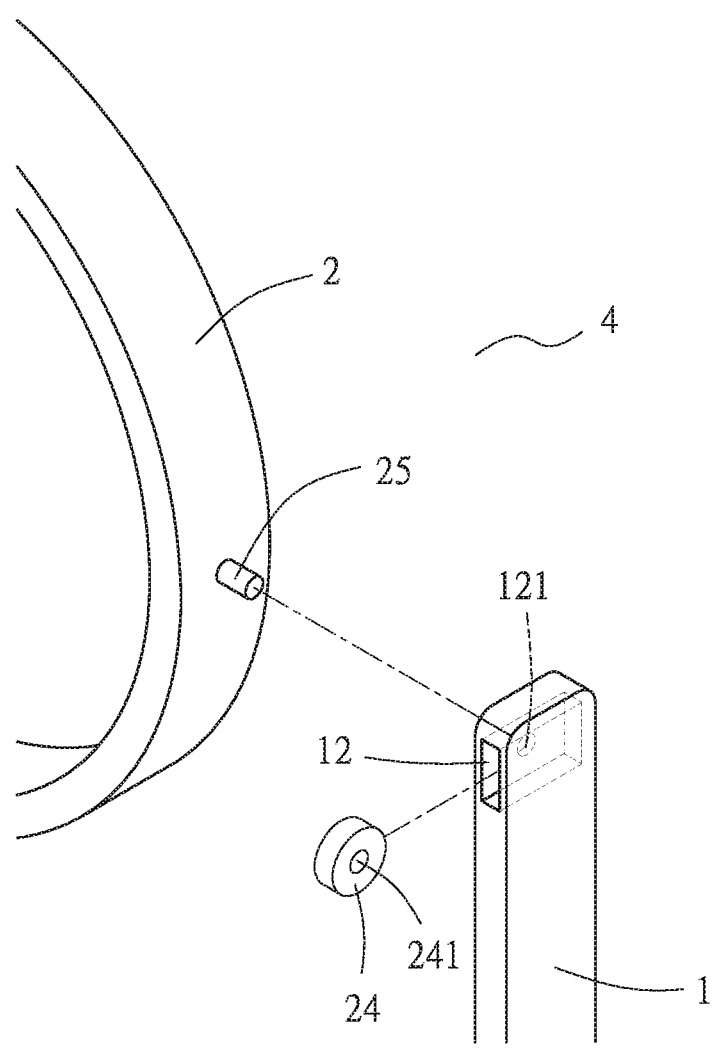
FIG. 12 shows another embodiment of the pivotal connection between the (outer) annular frame and the supporting frame in the present invention.

Besides, the pivotal connection between the annular frame 2 of the toy 4 and the inwardly extending rods 11 of the supporting frame 1 may be designed differently. In FIG. 12, for example, each of the two lateral sides of the supporting frame 1 is provided therein with a receiving area 12 at a predetermined height, each receiving area 12 is provided therein with a bearing 24 having a bore 241, each of the two lateral inner sides of the supporting frame 1 has a hole 121 corresponding to one of the receiving areas 12, and a pair of rods 25 extend respectively from two opposite positions of the outer periphery of the annular frame 2. The rods 25 are inserted respectively into the holes 121 of the supporting frame 1 and then into the bore 241 of the corresponding bearing 24 such that the annular frame 2 is pivotally connected to the supporting frame 1. (This alternative configuration for pivotally connecting the annular frame 2 to the supporting frame 1 can also be applied to the pivotal connection between the outer annular frame 22 and the supporting frame 1 of the toy 4'.)

The numerals as corresponding to the elements in the Claims are shown as follows:
11. . . . first rods;
31. . . . second rods;
233. . . . third rods; and
25. . . . fourth rods.

What is claimed is:

1. A toy for pets, wherein the toy provides a running space in which a pet is able to run, the running space is changeable in direction during use in order for the pet to run in different directions, and the toy comprises: a supporting frame, at least an outer annular frame, an inner annular frame, and a running ball, the toy being characterized in that:

the inner annular frame comprises plural pairs of opposite receiving areas located respectively inside predetermined sections of the inner annular frame and spaced apart from one another, the outer annular frame comprises plural pairs of opposite receiving areas located respectively inside predetermined sections of the outer annular frame and spaced apart from one another, each said receiving area is provided therein with a bearing having a bore, the inner annular frame has an inner periphery provided with plural pairs of opposite holes corresponding respectively to the plural pairs of opposite receiving areas in the inner annular frame, the inner annular frame has an outer periphery provided with a pair of outwardly extending and opposite third rods, the outer annular frame has an inner periphery provided with at least one pair of opposite holes corresponding respectively to one of the plural pairs of opposite receiving areas in the outer annular frame, and the third rods are inserted respectively into the pair of opposite holes in the inner periphery of the outer annular frame and then into the bores of the bearings in the corresponding pair of opposite receiving areas in the outer annular frame such that the inner annular frame is pivotally connected to the outer annular frame;

the outer annular frame has an outer periphery provided with at least one pair of opposite holes corresponding respectively to another of the plural pairs of opposite receiving areas in the outer annular frame, the supporting frame has two lateral sides each provided with an inwardly extending first rod, and the first rods are inserted respectively into the pair of opposite holes in the outer periphery of the outer annular frame and then into the bores of the bearings in the corresponding pair of opposite receiving areas in the outer annular frame such that the outer annular frame is pivotally connected to the supporting frame;

the running ball has a central axis, each of two opposite ends of the central axis is extended with a second rod, and the second rods are able to be inserted respectively into any of the plural pairs of opposite holes in the inner periphery of the inner annular frame and then into the bores of the bearings in the corresponding pair of opposite receiving areas in the inner annular frame such that the running ball is pivotally connected to the inner annular frame; and once the toy is assembled, a pet placed into the running ball to run therein is able to generate a driving force while running, and the driving force is able to change a direction of the running ball, which is pivotally connected to the inner annular frame, a direction of the inner annular frame, which is pivotally connected to the outer annular frame, and a direction of the outer annular frame, which is pivotally connected to the supporting frame, thereby changing a running direction of the pet.

2. The toy of claim 1, wherein the central axis of the running ball is tiltable with respect to the inner annular frame by inserting the second rods respectively into a selected one of the plural pairs of opposite holes in the inner periphery of the inner annular frame and the into the bores of the bearings in the corresponding pair of opposite receiving areas in the inner annular frame, and when the central axis of the running ball is tilted, the driving force generated by the pet is still able to change the direction of the running ball, the direction of the inner annular frame, and the direction of the outer annular frame and thereby change the running direction of the pet.

3. The toy of claim 1, wherein the second rods extending respectively from the two opposite ends of the central axis of the running ball are each formed with a protuberance at a predetermined position, and once the second rods are inserted respectively into the pair of opposite holes in the inner periphery of the inner annular frame and then into the bores of the bearings in the corresponding pair of opposite receiving areas, the protuberances lie generally between the inner annular frame and the running ball to allow the running ball to rotate smoothly in a space surrounded by the inner annular frame.

4. The toy of claim 1, wherein the pair of opposite third rods extending outward from the outer periphery of the inner annular frame are each formed with a protuberance at a predetermined position, and once the third rods are inserted respectively into the pair of opposite holes in the inner periphery of the outer annular frame and then into the bores of the bearings in the corresponding pair of opposite receiving areas in the outer annular frame, the protuberances lie generally between the inner annular frame and the outer annular frame to allow the inner annular frame, to which the running ball is pivotally connected, to rotate smoothly in a space surrounded by the outer annular frame.

* * * * *